United States Patent [19]
Gregory et al.

[11] Patent Number: 5,222,617
[45] Date of Patent: Jun. 29, 1993

[54] DRILLING TURBINE BLADES

[75] Inventors: Owen Gregory, Belper; Anthony J. Griffith; David Stroud, both of Bristol, all of England

[73] Assignee: Rolls-Royce plc, London, England

[21] Appl. No.: 775,441

[22] Filed: Oct. 15, 1991

[30] Foreign Application Priority Data

Oct. 17, 1990 [GB] United Kingdom ............... 9022608

[51] Int. Cl.⁵ ............................................. B23K 26/00
[52] U.S. Cl. ......................... 219/121.71; 219/121.85
[58] Field of Search ........... 219/121.7, 121.71, 121.83, 219/121.85

[56] References Cited

U.S. PATENT DOCUMENTS

| | | | |
|---|---|---|---|
| 4,574,451 | 3/1986 | Smashey et al. | 29/423 |
| 4,873,414 | 10/1989 | Ma et al. | 219/121.7 |
| 5,011,626 | 4/1991 | Ma et al. | 219/121.7 X |

Primary Examiner—C. L. Albritton
Attorney, Agent, or Firm—Oliff & Berridge

[57] ABSTRACT

Small cooling holes, e.g. 0.25-0.9 mm diameter, in cast hollow turbine blades are provided by delivering successive pulses of laser energy to the surface of the blade until penetration of the blade is complete. By leaving the ceramic casting core in situ within the blade during drilling, the laser beam is prevented from striking through to the far wall of the cavity defined by the ceramic core within the blade. The ceramic core is subsequently removed by leaching techniques common to the art.

4 Claims, 1 Drawing Sheet

DRILLING TURBINE BLADES

FIELD OF THE INVENTION

This invention concerns improvements in or relating to the drilling of turbine blades in gas turbine engines.

Turbine blades in high performance aircraft gas turbine engines are frequently subjected to working temperatures near or even above the melting point of the alloy of which the blades are made. In order to maintain the integrity of the blades under working conditions it is now common practice to provide cavities within the blades, the cavities being produced by casting the blade around a ceramic core and subsequently removing the core, and holes from the cavities to the exteriors of the blades, both to surfaces and edges, and directing cooling air from the cavities through the holes over the surfaces and edges. The number, shape, disposition and size of the holes are parameters which are essential to the efficient cooling of the blades by this method, the diameter of each hole typically being less than 1 mm.

The invention particularly concerns the efficient drilling of small cooling holes in hollow turbine blades of high performance aircraft gas turbine engines.

DESCRIPTION OF THE PRIOR ART

The cooling holes contemplated by the invention are typically of small diameter, e.g. 0.25-0.9 mm, and one efficient way of drilling them accurately is by means of high intensity coherent radiation (laser light) directed at the blade. This may be done in one of two methods:

(i) Trepan drilling, where the material is penetrated by a focused laser beam and then trepan optics, controlled by a computerised numerical controller, cuts out the hole to the required diameter.

(ii) Percussion drilling, where the hole diameter required is provided by the focused laser beam diameter. This is done by delivering a number of laser pulses at a given energy to the surface of the blade until penetration is achieved. Percussion drilling may be expected to be quicker than trepan drilling.

The principal disadvantages of laser drilling are, firstly, that, when the laser beam strikes through into the hollow interior of the blade at the end of the drilling, there is the likelihood of damage to the opposite wall of the cavity of the blade before the laser can be switched off, and, secondly, debris from the laser drilling will be left within the cavity.

Hitherto, these disadvantages have been overcome by inserting polytetrafluoroethylene (PTFE) rod or sheet into the cavity prior to drilling. The PTFE protects the far wall of the cavity from strike-through by the beam, and absorbs most of the debris.

However, with the trend to smaller high-performance blades it becomes increasingly difficult, and sometimes impossible, to insert PTFE into the blade cavity, which, in any event may be difficult to access.

It is an object of the present invention to provide an alternative method of protecting the far wall of a cavity in a hollow turbine blade from laser strike-through during the laser drilling of a hole.

BRIEF SUMMARY OF THE INVENTION

According to the present invention there is provided a method of drilling a hole into a cavity of a hollow cast turbine blade from an external surface or edge of the blade whilst protecting a far wall of the cavity from damage during the drilling, the method comprising, subsequent to casting the blade round a ceramic core so as to generate a cavity defined by the core, the steps of, leaving the core in situ within the blade, drilling by means of a laser beam a hole through an external surface or edge of the blade into the cavity defined by the core, and subsequently removing the core from within the blade, whereby the energy of the laser beam subsequent to strike-through is absorbed by the ceramic core.

It will be understood that the term "blade" in this disclosure refers not only to aerofoil blades on the rotor disc of a gas turbine engine but also, where applicable, to stationary blade-like structures such as stator vanes which in some circumstances may be subjected to intense heat and will therefore require cooling holes.

BRIEF DESCRIPTION OF THE DRAWINGS

The invention will now be described by way of example only with reference to the accompanying schematic drawings in which.

DETAILED DESCRIPTION OF THE INVENTION

Figure 1:
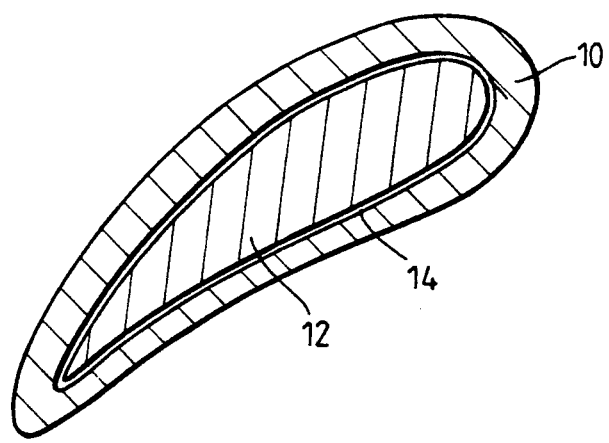
FIG. 1 is a section through a cast turbine blade including a ceramic core.

Referring to FIG. 1 of the drawings there is shown a cast alloy gas turbine engine blade 10 that has previously been cast round a ceramic core 12 so as to provide a cavity 14 within the blade, the core being left in situ.

Figure 2:
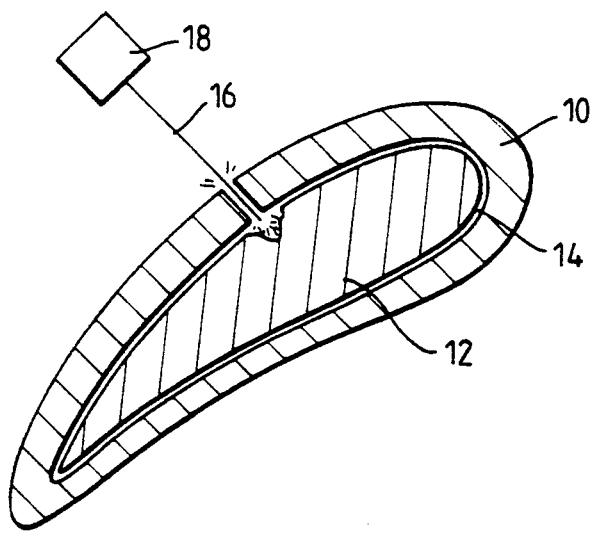
FIG. 2 is the blade of FIG. 1 during a drilling process.

FIG. 2 shows the blade 10 of FIG. 1, still retaining within it the ceramic core 12, being percussion drilled by a laser beam 16 generated by a laser 18 which includes timing, break-through detection and other control circuits well known in the art. It will be seen that the beam 16, on breaking through the wall of the blade 10, is absorbed by the ceramic core 12 which also absorbs a large amount of debris from the hole. In one example drilling, it was found that the laser beam had penetrated the core by about 70%, but had left the opposing wall undamaged.

Figure 3:
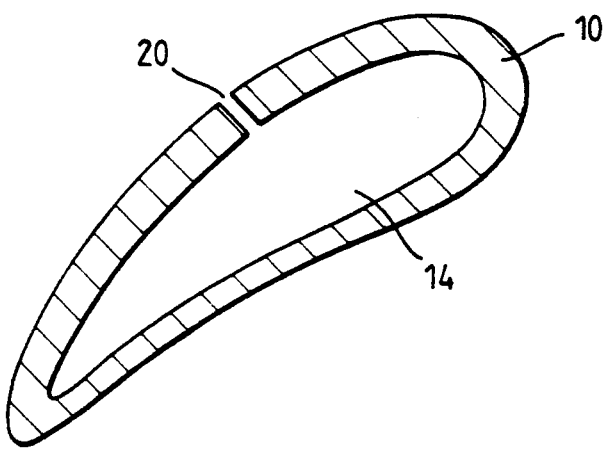
FIG. 3 is the blade of FIG. 2 when the drilling process is complete.

After drilling has been completed, the ceramic core 12 is leached out by leaching techniques common to the art, and which therefore need not be described herein, to leave, as shown in FIG. 3, the hollow blade 10 with a laser drilled cooling hole 20.

We claim:

1. A method of drilling a hole into a cavity of a hollow cast turbine blade from an external surface or edge of the blade while protecting a far wall of the cavity from damage during the drilling, the method comprising, subsequent to casting the blade around a ceramic core so as to generate a cavity defined by the ceramic core, the steps of, leaving the ceramic core in situ within the blade, drilling by means of a laser beam a hole through an external surface or edge of the blade into the cavity defined by the ceramic core, whereby the energy of the laser beam subsequent to strike-through is absorbed by the ceramic core, and subsequently removing the ceramic core from within the blade.

2. A method as claimed in claim 1 wherein the drilling is carried out by delivering successive pulses of laser energy to the surface of the blade until penetration is complete.

3. A method as claimed in claim 1 further comprising removing the core from within the blade by leaching.

4. A method as claimed in claim 1, wherein a size of the hole drilled is typically from 0.25 mm to 0.9 mm.

* * * * *